3,055,894
NEW HETEROCYCLIC AMIDES
Joseph G. Lombardino, New London, and William M. McLamore, Groton, Conn., assignors to Chas. Pfizer & Co., Inc., New York, N.Y., a corporation of Delaware
No Drawing. Filed Mar. 9, 1960, Ser. No. 13,721
8 Claims. (Cl. 260—247.5)

This invention relates to new and useful heterocyclic amides as well as to novel methods and intermediates for their preparation. More particularly, it is concerned with novel organic ring-nitrogen compounds which have an amide function in their molecular structure. Additionally, it is also concerned with the non-toxic acid addition and quaternary ammonium salts of the aforementioned organic nitrogen bases. There is also included within the purview of this invention various pharmaceutical compositions which have at least one of the herein described compounds as their essential active ingredient.

The compounds which are included within the scope of this invention are selected from the class of benzopyridocoline bases corresponding to the following general structural formula:

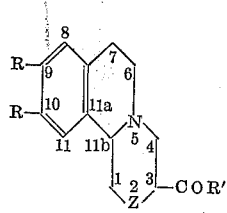

and the pharmaceutically acceptable acid addition and quarternary ammonium salts thereof, wherein R is a member of the group consisting of hydrogen, hydroxy, lower alkoxy and alkyl having from one to five carbon atoms, and when both R groups are taken together they form a methylenedioxy group; R' is chosen from the group consisting of amino, N-monoalkylamino, N,N-dialkylamino, N-aralkylamino, N-picolinylamino, N-lutidinylamino, N-collidinylamino, N-anilino, N-(p-toluidino), N-(p-anisidino), N-pyridylamino, N-alkyl-N-phenylamino, N-pyrryl, N-pyrrolidino, N-piperidino, N-(2-methylpiperidino), N-morpholino, N-piperazino and N-(N'-methylpiperazino), each alkyl group in R' being lower alkyl; and Z is a member of the group consisting of carbonyl and hydroxymethylene. The Patterson system of nomenclature is employed throughout this specification as is illustrated by the foregoing structural formula for a 2-oxy-3-carboxamido-9,10-disubstituted-1,2,3, 4,6,7-hexahydro-11b-H-benzopyridocoline [see A. M. Patterson and L. T. Capell, The Ring Index, Reinhold Publishing Corp., New York (1940)].

In accordance with the present invention, the aforementioned benzopyridocoline amides have been found to possess interesting pharmaceutical properties which render them useful as synthetic medicinals. For instance, these compounds have been shown to exhibit utility as tranquilizers and as sedatives in addition to being useful as cardiovascular agents. Of especial value in this connection are those benzopyridocoline amides whose 3-amido function includes such groups as N,N-diethylcarboxamido, N-methyl-N-phenylcarboxamido, carbo(N-pyrrolidino), carbo(N-piperidino), carbo(N-morpholino), carbo(N-piperazino), and the like.

In accordance with the process for preparing the compounds of this invention, an appropriately substituted 2-oxo - 3 - carboalkoxy - 1,2,3,4,6,7 - hexahydro - 11b - H-benzopyridocoline is treated with at least an equimolar amount of an amine having the formula R'H wherein R' is defined as aforesaid. Subsequent reduction of the resulting 2-oxo-3-carboxamido-1,2,3,4,6,7-hexahydro-11b-H-benzopyridocoline by means of catalytic hydrogenation affords the corresponding 2-hydroxy compounds. The starting materials employed in this process, viz., the benzopyridocoline esters and desired amine bases, are for the most part known compounds, which are either readily prepared by those skilled in the art or else they are commercially available. The latter is particularly true in the case of the organic amine reagents, while methods for the preparation of the benzopyridocoline esters have been reported in Belgian Patent No. 565,824 (March 18, 1958).

In accordance with a more specific embodiment of the process of this invention, the reaction between the benzopyridocoline ester and the appropriate amine base is generally carried out by mixing the two components in a reaction-inert organic solvent and then stirring the resultant mixture at or near room temperature. As previously indicated, it is only necessary that these two reactants be present in substantially equimolar amounts in order to effect this reaction, although a slight excess of one or the other is not harmful in this respect and may even be desirable in the case of the more readily available base reagent inasmuch as it serves to shift the reaction equilibrium to completion. Preferred reaction solvents in this connection include such lower alkanols as methanol, ethanol, isopropanol, and the like, as well as such aromatic hydrocarbons as benzene, toluene, xylene, and so forth. In some instances when a lower alkyl benzopyridocoline ester is employed as the starting material, it is even possible to conduct the reaction in the absence of a solvent. In such cases, it may be convenient to distill off the volatile alcohol by-product as it is formed so as to force the reaction to completion by shifting the equilibrium to the right hand side of the equation, but this is not absolutely necessary nor is it even desirable if deleterious effects were to ensue due to the higher temperature. Hence, it is usually more feasible to conduct the process in a reaction-inert polar organic solvent system as aforesaid, especially if the two reactants are not mutually miscible. Among the various benzopyridocoline esters which may be used are the methyl, ethyl, isopropyl, n-butyl, isoamyl, n-hexyl, 2-ethylhexyl and n-octyl esters, and the like. Typical amine reagents for use in this process include such organic amines as diethylamine, piperazine, N-methylaniline, pyrrole, pyrrolidine, piperidine, morpholine, and so forth.

The acids which are used to prepare the pharmaceutically acceptable acid addition salts of the aforementioned benzopyridocoline amide bases are those which form non-toxic acid addition salts containing pharmaceutically acceptable anions, such as the hydrochloride, hydrobromide, hydriodide, nitrate, sulfate or bisulfate, phosphate or acid phosphate, acetate, lactate, citrate or acid citrate, tartrate or bitartrate, oxalate, succinate, maleate, gluconate and saccharate salts. Suitable quaternary ammonium salts of the benzopyridocoline amide derivatives of this invention include those which are obtained by reacting the benzopyridocoline amide bases of the foregoing type with a pharmaceutically acceptable organic halide, such as methyl iodide, ethyl chloride, allyl chloride, benzyl bromide, and the like, or with an equally acceptable sulfuric acid lower alkyl ester or an arylsulfonic acid lower alkyl ester, such as dimethyl sulfate, diethyl sulfate, methyl benzenesulfonate, ethyl p-toluenesulfonate, and the like.

As previously indicated, the compounds of the present invention are readily adapted to therapeutic use as hypotensive agents in addition to being useful as sedatives in view of their ability to reduce serotonin and norepinephrine blood levels in the brain. Furthermore, the toxicity of these benzopyridocoline amides has been found to be quite low when they are administered to mice in amounts that are sufficient to achieve the desired effects as hereinafter indicated. Moreover, no other harmful pharmacological side effects have been observed to occur as a result of their administration. The aforementioned biological activity of the herein described compounds is well illustrated by a series of tests previously described in the literature and hence, well-known to those skilled in the art. For instance, the percent decrease in serotonin and norepinephrine levels in the rabbit can be determined by the procedure described by P. Shore et al. in the Journal of Pharmacology and Experimental Therapeutics, vol. 122, p. 295 (1958), as well as by S. Udenfriend et al. in Science, vol. 122, p. 972 (1955).

In accordance with a method of treatment of the present invention, the herein described benzopyridocoline amide derivatives can be administered to an agitated subject via the oral or parenteral routes. In general, these compounds are most desirably administered in doses ranging from about 50 mg. to about 500 mg. per day, although variations will necessarily occur depending upon the weight of the subject being treated and the particular route of administration chosen. However, a dosage level that is in the range of from about 0.7 mg. to about 7.0 mg. per kg. of body weight per day is most desirably employed in order to achieve effective results. Nevertheless, it is to be appreciated that still other variations may also occur in this respect, depending upon the species of animal being treated and its individual response to said medicament, as well as on the particular type of formulation chosen and the time period and interval at which such administration is carried out. In some instances, dosage levels below the lower limit of the aforesaid range may be more than adequate, while in other cases still larger dosages may be employed without causing any harmful or deleterious side effects provided that such higher levels are first divided into several smaller doses that are to be administered throughout the day.

In connection with the use of the benzopyridocoline amide compounds of this invention for the treatment of agitated subjects, it is to be noted that they may be administered either alone or in combination with a pharmaceutically acceptable carrier by either of the routes previously indicated, and that such administration can be carried out in both single and multiple dosages. More particularly, the novel compounds of this invention can be administered in a wide variety of dosage forms, i.e., they may be combined with various pharmaceutically acceptable inert carriers in the form of tablets, capsules, lozenges, troches, hard candies, powders, sprays, aqueous suspensions, injectable solutions, elixirs, syrups, and the like. Such carriers include solid diluents or fillers, sterile aqueous media and varous non-toxic organic solvents, etc. Moreover, such oral pharmaceutical compositions can be sweetened and/or flavored by means of various agents of the type commonly employed for such a purpose. In general, the therapeutically-active compounds of this invention are present in such dosage forms at concentration levels ranging from about 0.5% to about 90% by weight of the total composition, i.e., in amounts which are sufficient to provide the desired unit dosage previously indicated.

For purposes of oral administration, tablets containing various excipients such as sodium citrate, calcium carbonate and dicalcium phosphate may be employed along with various disintegrants such as starch and preferably potato or tapioca starch, alginic acid and certain complex silicates, together with binding agents such as polyvinylpyrrolidone, sucrose, gelatin and acacia. Additionally, lubricating agents such as magnesium stearate, sodium lauryl sulfate and talc are often very useful for tableting purposes. Solid compositions of a similar type may also be employed as fillers in soft and hard-shelled gelatin capsules; preferred materials in this connection also include lactose or milk sugar as well as high molecular weight polyethylene glycols. When aqueous suspensions and/or elixirs are desired for oral administration, the essential active ingredient may be combined with various sweetening or flavoring agents, coloring matter or dyes and, if so desired, emulsifying and/or suspending agents, together with such diluents as water, ethanol, propylene glycol, glycerin and various combinations thereof.

For purposes of parenteral administration, solutions of the benzopyridocoline amide bases in sesame or peanut oil or in aqueous-propylene glycol may be employed, as well as sterile aqueous solutions of the corresponding water-soluble acid addition salts previously enumerated. Such aqueous solutions should be suitably buffered if necessary and the liquid diluent rendered isotonic with sufficient glucose or saline. These particular aqueous solutions are especially suitable for intravenous, intramuscular and subcutaneous injection purposes. In this connection, the sterile aqueous media employed are readily obtained by standard techniques well-known to those in the art. For instance, distilled water is ordinarily used as the liquid diluent and the final preparation is passed through a suitable bacterial filter, such as a sintered-glass filter or a diatomaceous-earth or unglazed porcelain filter. Preferred filters of this type include the Berkefeld, the Chamberland and the asbestos disc-metal Seitz filter, wherein the fluid is sucked through the filter candle into a sterile container with the aid of a suction pump. Needless to say, the necessary steps should be taken throughout the preparation of these injectable solutions to ensure that the final products are obtained in a sterile condition.

This invention is further illustrated by the following examples, which are not to be construed as imposing any limitations on the scope thereof. On the contrary, it is to be clearly understood that resort may be had to various other embodiments, modifications and equivalents thereof which readily suggest themselves to those skilled in the art without departing from the spirit of the present invention and/or the scope of the appended claims.

*Example I*

A solution consisting of 3.4 g. (0.01 mole) of 2-oxo-3-carboethoxy - 9,10-dimethoxy-1,2,3,4,6,7-hexahydro-11b-H-benzopyridocoline and 0.8 g. (0.011 mole) of freshly distilled diethylamine dissolved in 50 ml. of xylene was refluxed under a nitrogen atmosphere for 24 hours. After cooling to room temperature, the reaction mixture was successively extracted with four-100 ml. portions of water. The aqueous phase was then discarded and the xylene layer was passed through a paper filter containing a bed of sodium sulfate and activated charcoal. The resulting filtrate was then heated under reduced pressure (65 mm. Hg) via a water bath at 50° C. in order to remove the xylene solvent, and the residual oil so obtained was cooled to approximately 5° C. and held at that point until a semi-solid formed (required approximately 16 hours). Recrystallization of the semi-solid from aqueous ethanol in the presence of activated charcoal afforded light yellow crystals of 2-oxo-3-(N,N-diethylcarboxamido)-9,10-dimethoxy - 1,2,3,4,6,7 - hexahydro-11b-H-benzopyridocoline, M.P. 150–152° C.

*Example II*

The procedure described in Example I is substantially followed except for the fact that other benzopyridocoline esters and/or other amine reagents are the starting materials employed, and the reaction itself is conducted in a closed system when said amine reagents happen to be in the gaseous state at room temperature. Thus, 6.8 g. (0.02 mole) of 2-oxo-3-carboethoxy-9,10-dimethoxy-1,2,3,4,6,7-hexahydro-11b-H-benzopyridocoline and 1.0 g. (0.022 mole) of dimethylamine react in accordance with the procedure of Example I to afford 2-oxo-3-(N,N-dimethylcarboxamido) - 9,10-dimethoxy-1,2,3,4,6,7-hexahydro-11b-

H-benzopyridocoline. In like manner and employing similar molar amounts of reactant and reagent in each case, 2-oxo-3-carboethoxy-9,10,dimethyl-1,2,3,4,6,7-hexahydro-11b-H-benzopyridocoline and ammonia react to afford 2-oxo-3-carboxamido-9,10-dimethyl-1,2,3,4,6,7-hexahydro-11b-H-benzopyridocoline; 2-oxo-3-carboethoxy-9,10 - diethyl-1,2,3,4,6,7-hexahydro-11b-H-benzopyridocoline and methylamine react to afford 2-oxo-3-(N-monomethylcarboxamido) - 9,10-diethyl-1,2,3,4,6,7-hexahydro-11b-H-benzopyridocoline; 2-oxo-3-carboethoxy-9,10-di(n-butyl) - 1,2,3,4,6,7-hexahydro-11b-H-benzopyridocoline and dimethylamine react to afford 2-oxo-3-(N,N-dimethylcarboxamido) - 9,10-di(n-butyl)-1,2,3,4,6,7-hexahydro-11b-H-benzopyridocoline; 2 - oxo-3-carboethoxy-9,10-di-isoamyl - 1,2,3,4,6,7-hexahydro-11b-H-benzopyridocoline and diethylamine react to afford 2-oxo-3-(N,N-diethylcarboxamido) - 9,10-di-isoamyl-1,2,3,4,6,7-hexahydro-11b-H-benzopyridocoline; 2-oxo-3-carboethoxy-9-hydroxy-10-methyl - 1,2,3,4,6,7-hexahydro-11b-H-benzopyridocoline and isopropylamine react to afford 2-oxo-3-(N-isopropylcarboxamido) - 9-hydroxy-10-methyl-1,2,3,4,6,7-hexahydro-11b-H-benzopyridocoline; 2-oxo-3-carboethoxy-9-ethoxy - 10-methoxy-1,2,3,4,6,7-hexahydro-11b-H-benzopyridocoline and di(n-butyl)-amine react to afford 2-oxo-3-(N,N - di-n-butylcarboxamido)-9-ethoxy-10-methoxy-1,2,3,4,6,7-hexahydro-11b-H-benzopyridocoline; 2-oxo-3-carboethoxy - 9,10-di-isopropoxy-1,2,3,4,6,7-hexahydro-11b-H-benzopyridocoline and benzylamine react to afford 2-oxo - 3-(N-benzylcarboxamido)-9,10-di-isopropoxy-1,2,3,4,6,7-hexahydro-11b-H-benzopyridocoline; 2-oxo-3-carboethoxy - 9,10-di-isoamyloxy-1,2,3,4,6,7-hexahydro-11b-H-benzopyridocoline and p-chlorobenzylamine react to afford 2-oxo-3-[N-(p-chlorobenzylcarboxamido)]-9,10-di-isoamyloxy - 1,2,3,4,6,7-hexahydro-11b-H-benzopyridocoline; 2-oxo-3-carboethoxy-9,10-methylenedioxy-1,2,3,4,6,7-hexahydro-11b-H-benzopyridocoline and β-phenylethylamine react to afford 2-oxo-3-[N-(β-phenylethylcarboxamido)] - 9,10-methylenedioxy-1,2,3,4,6,7-hexahydro-11b-H-benzopyridocoline; 2-oxo-3-carboethoxy-9,10-dihydroxy-1,2,3,4,6,7-hexahydro-11b-H-benzopyridocoline and m-xylylamine react to afford 2-oxo-3-[N-(m-xylylcarboxamido)] - 9,10-dihydroxy-1,2,3,4,6,7-hexahydro-11b-H-benzopyridocoline; 2-oxo-3-carboethoxy-1,2,3,4,6,7-hexahydro-11b-H-benzopyridocoline and p-chlorobenzohydrylamine react to afford 2-oxo-3-[N-(p-chlorobenzohydrocarboxamido)] - 1,2,3,4,6,7-hexahydro-11b-H-benzopyridocoline; 2 - oxo-3-carboethoxy-9-10-dimethyl-1,2,3,4,6,7-hexahydro - 11b-H-benzopyridocoline and α-picolynylamine react to afford 2-oxo-3-[N-(α-picolynylcarboxamido)] - 9,10-dimethyl-1,2,3,4,6,7-hexahydro-11b-H-benzopyridocoline; 2-oxo-3-carboethoxy-9,10-dimethoxy-1,2,3,4,6,7-hexahydro-11b-H-benzopyridocoline and β-picolynylamine react to afford 2-oxo-3-[N-(β-picolynylcarboxamido)] - 9,10-dimethoxy-1,2,3,4,6,7-hexahydro-11b-H-benzopyridocoline; 2-oxo-3-carboethoxy-9,10-methylenedioxy - 1,2,3,4,6,7 - hexahydro-11b-H-benzopyridocoline and γ-picolynylamine react to afford 2-oxo-3-[N-(γ-picolynylcarboxamido)] - 9,10 - methylenedioxy-1,2,3,4,6,7-hexahydro - 11b-H-benzopyridocoline; 2-oxo-3-carboethoxy - 9,10-diethyl-1,2,3,4,6,7-hexahydro-11b-H-benzopyridocoline and lutidinylamine react to afford 2-oxo-3-(N-lutidinylcarboxamido) - 9,10-diethyl-1,2,3,4,6,7-hexahydro-11b-H-benzopyridocoline; 2-oxo-3-carboethoxy-9,10-di(n-butyl)-1,2,3,4,6,7 - hexahydro-11b-H-benzopyridocoline and collidinylamine react to afford 2-oxo-3-(N-collidinylcarboxamido) - 9,10-di(n-butyl)-1,2,3,4,6,7-hexahydro-11b-H-benzopyridocoline; 2-oxo-3-carboethoxy-9,10 - di-isoamyl-1,2,3,4,6,7-hexahydro-11b-H-benzopyridocoline and aniline react to afford 2-oxo-3-(N-anilinocarboxamido) - 9,10-di-isoamyl-1,2,3,4,6,7-hexahydro-11b-H - benzopyridocoline; 2-oxo-3-carboethoxy-9-ethoxy-10-methoxy - 1,2,3,4,6,7-hexahydro-11b-H-benzopyridocoline and p-toluidine react to afford 2-oxo-3-[N-(p-toluidinocarboxamido)] - 9-ethoxy-10-methoxy-1,2,3,4,6,7-hexahydro - 11b-H-benzopyridocoline; and 2-oxo-3-carboethoxy - 1,2,3,4,6,7-hexahydro-11b-H-benzopyridocoline and p-anisidine react to afford 2-oxo-3-[N-(p-anisidinocarboxamido)] - 1,2,3,4,6,7 - hexahydro-11b-H-benzopyridocoline.

In like manner, 2-oxo-3-carboethoxy-9,10-dimethoxy-1,2,3,4,6,7-hexahydro-11b-H-benzopyridocoline and N-methylaniline react to afford 2-oxo-3-(N-methyl-N-phenylcarboxamido) - 9,10-dimethoxy-1,2,3,4,6,7-hexahydro-11b-H-benzopyridocoline; 2-oxo-3-carboethoxy-9,10-diethoxy - 1,2,3,4,6,7-hexahydro-11b-H-benzopyridocoline and N-ethylaniline react to afford 2-oxo-3-(N-ethyl-N-phenylcarboxamido) - 9,10-diethoxy-1,2,3,4,6,7-hexahydro-11b-H-benzopyridocoline; 2-oxo-3-carboethoxy-9,10-di-isopropoxy-1,2,3,4,6,7-hexahydro-11b-H-benzopyridocoline and 2-pyridylamine react to afford 2-oxo-3-[N-(2-pyridylcarboxamido)] - 9,10-diisopropoxy-1,2,3,4,6,7-hexahydro-11b-H-benzopyridocoline; 2-oxo-3-carboethoxy-9,10-di(n-butoxy) - 1,2,3,4,6,7-hexahydro-11b-H-benzopyridocoline and 3-pyridylamine react to afford 2-oxo-3-[N-(3-pyridylcarboxamido)] - 9,10-di(n-butoxy)-1,2,3,4,6,7-hexahydro-11b-H-benzopyridocoline; 2-oxo-3-carboethoxy-9,10-di - isoamyloxy-1,2,3,4,6,7-hexahydro-11b-H-benzopyridocoline and 4-pyridylamine react to afford 2-oxo-3-[N-(4 - pyridylcarboxamido)]-9,10-di-isoamyloxy-1,2,3,4,6,7-hexahydro - 11b-H-benzopyridocoline; 2-oxo-3-carboethoxy - 9,10-methylenedioxy-1,2,3,4,6,7-hexahydro-11b-H-benzopyridocoline and pyrrole react to afford 2-oxo-3-carbo(N - pyrryl)-9,10-methylenedioxy-1,2,3,4,6,7-hexahydro-11b-H-benzopyridocoline; 2-oxo-3-carboethoxy-9,10-dihydroxy - 1,2,3,4,6,7-hexahydro-11b-H-benzopyridocoline and pyrrolidine react to afford 2-oxo-3-carbo(N-pyrrolidino) - 9,10 - dihydroxy-1,2,3,4,6,7-hexahydro-11b-H-benzopyridocoline; 2-oxo-3-carboethoxy-1,2,3,4,6,7-hexahydro-11b-H-benzopyridocoline and piperidine react to afford 2-oxo-3-carbo(N-piperidino)-1,2,3,4,6,7-hexahydro-11b - H-benzopyridocoline; 2-oxo-3-carboethoxy-9,10-dimethyl - 1,2,3,4,6,7-hexahydro-11b-H-benzopyridocoline and 2-methylpiperidine react to afford 2-oxo-3-carbo[N-(2-methylpiperidino)] - 9-10-dimethyl-1,2,3,4,6,7-hexahydro-11b-H-benzopyridocoline; 2-oxo-3-carboethoxy-9-10-diethyl - 1,2,3,4,6,7-hexahydro-11b-H-benzopyridocoline and morpholine react to afford 2-oxo-3-carbo(N-morpholino) - 9,10-diethyl-1,2,3,4,6,7-hexahydro-11b-H-benzopyridocoline; 2-oxo-3-carboethoxy-9,10-dimethoxy-1,2,3,4,6, 7-hexahydro-11b-H-benzopyridocoline and piperazine react to afford 2-oxo-3-carbo(N-piperazino)-9,10-dimethoxy-1,2,3,4,6,7-hexahydro-11b-H-benzopyridocoline; and 2 - oxo-3-carboethoxy-9,10-di-isoamyl-1,2,3,4,6,7-hexahydro-11b-H-benzopyridocoline and N-methylpiperazine react to afford 2-oxo-3-carbo[N-(N-methylpiperazino)]-9,10 - di-isoamyl-1,2,3,4,6,7-hexahydro-11b-H-benzopyridocoline.

*Example III*

The procedure described in Example I is followed except for the fact that other 2-oxo-3-carboalkoxy-1,2,3,4,6, 7-hexahydro-11b-H-benzopyridocolines are employed as starting materials in lieu of the 3-carboethoxy ester. Included among the esters of 2-oxo-3-carboxy-9,10-dimethoxy - 1,2,3,4,6,7 - hexahydro - 11b-H-benzopyridocoline which have been specifically employed in lieu of the ethyl ester are the methyl ester, the isopropyl, n-butyl, isoamyl, n-hexyl, 2-ethyl-hexyl and n-octyl esters. In each and every case, the corresponding product obtained is 2-oxo - 3-(N,N-diethylcarboxamido)-9,10-dimethoxy-1,2,3, 4,6,7-hexahydro-11b-H-benzopyridocoline.

*Example IV*

A mixture consisting of 4.1 g. (0.0119 mole) of 2-oxo-3 - (N,N-diethylcarboxamido)-9,10-dimethoxy-1,2,3,4,6, 7-hexahydro-11b-H-benzopyridocoline, 0.4 g. of Raney nickel and 50 ml. of ethanol is placed in a standard catalytic hydrogenation pressure apparatus [e.g., see the shaking autoclave pressure apparatus illustrated on page 533 of M. R. Fenski's authoritative review entitled, "Hydrogenation" in P. H. Groggins, Unit Processes in Organic Synthesis, Third Edition, McGraw-Hill Book Co., Inc., London and New York (1947)], and shaken under a pressure of 100 atmospheres of hydrogen at 150–160° C. After the initial drop in pressure due to the absorption of gas by the catalyst and solvent, there is obtained a steady fall in pressure due to hydrogenation of the substrate until approximately one mole of hydrogen has been absorbed (at which point the rate of hydrogen absorption becomes nil). Upon completion of the reaction, the heating source is removed and the reaction is allowed to cool to room temperature, at which point the pressure is readjusted to atmospheric conditions. The catalyst is then recovered by means of filtration, and the resulting filtrate is evaporated to dryness under reduced pressure to afford 2-hydroxy - 3-(N,N-diethylcarboxamido)-9,10-dimethoxy-1,2,3,4,6,7-hexahydro-11b-H-benzopyridocoline as the residual material.

*Example V*

The procedure described in Example IV is followed except that 8.7 g. (0.0119 mole) of 2-oxo-3-(N,N-dimethylcarboxamido) - 9,10 - dimethoxy-1,2,3,4,6,7-hexahydro-11b-H-benzopyridocoline is the starting material employed and 2-hydroxy-3-(N,N-dimethylcarboxamido)-9,10-dimethoxy - 1,2,3,4,6,7 - hexahydro-11b-H-benzopyridocoline is the corresponding product obtained. In the same manner and employing like amounts of reactant and reagent as used in the previous example, 2-oxo-3-carboxamido - 9,10 - dimethyl-1,2,3,4,6,7-hexahydro-11b-H-benzopyridocoline is converted to 2-hydroxy-3-carboxamido-9,10-dimethyl - 1,2,3,4,6,7 - hexahydro-11b-H-benzopyridocoline; 2-oxo-3-(N-monomethylcarboxamido)-9,10-diethyl - 1,2,3,4,6,7 - hexahydro-11b-H-benzopyridocoline is converted to 2-hydroxy-3-(N-monomethylcarboxamido)-9,10-diethyl - 1,2,3,4,6,7 - hexahydro-11b-H-benzopyridocoline; 2-oxo-3-(N,N-dimethylcarboxamido)-9,10-di(n-butyl) - 1,2,3,4,6,7 - hexahydro-11b-H-benzopyridocoline is converted to a 2-hydroxy-3-(N,N-dimethylcarboxamido) - 9,10 - di(n-butyl)-1,2,3,4,6,7-hexahydro-11b-H-benzopyridocoline; 2-oxo-3-(N,N-diethylcarboxamido)-9,10-di-isoamyl-1,2,3,4,6,7 - hexahydro-11b-H-benzopyridocoline is converted to 2-hydroxy-3-(N,N-diethylcarboxamido) - 9,10-di-isoamyl - 1,2,3,4,6,7 - hexahydro-11b-H-benzopyridocoline; 2-oxo-3-(N-isopropylcarboxamido)-9-hydroxy-10-methyl - 1,2,3,4,6,7 - hexahydro-11b-H-benzopyridocoline is converted to 2-hydroxy-3-(N-isopropylcarboxamido)-9-hydroxy - 10 - methyl-1,2,3,4,6,7-hexahydro-11b-H-benzopyridocoline; 2-oxo-3-(N,N-di-n-butylcarboxamido)-9-ethoxy - 10 - methoxy - 1,2,3,4,6,7-hexahydro-11b-H-benzopyridocoline is converted to 2-hydroxy-3 - (N,N-di-n-butylcarboxamido) - 9-ethoxy-10-methoxy-1,2,3,4,6,7-hexahydro-11b-H-benzopyridocoline; 2-oxo-3-(N-benzylcarboxamido)-9,10-di-isopropoxy - 1,2,3,4,6,7-hexahydro-11b-H-benzopyridocoline is converted to 2-hydroxy-3-(N-benzylcarboxamido) - 9,10-di-isopropoxy-1,2,3,4,6,7-hexahydro-11b-H-benzopyridocoline; 2-oxo-3-[N-(p-chlorobenzylcarboxamido)] - 9,10-di-isoamyloxy-1,2,3,4,6,7 - hexahydro-11b-H-benzopyridocoline is converted to 2-hydroxy-3-[N - (p-chlorobenzylcarboxamido)]-9,10-di-isoamyloxy - 1,2,3,4,6,7 - hexahydro-11b-H-benzopyridocoline; 2-oxo-3-[N-(β-phenylethylcarboxamido)] - 9,10-methylenedioxy-1,2,3,4,6,7-hexahydro-11b-H-benzopyridocoline is converted to 2-hydroxy-3-[N-(β-phenylethylcarboxamido)] - 9,10-methylenedioxy-1,2,3,4,6,7-hexahydro-11b-H-benzopyridocoline; 2-oxo-3-[N-(m-xylylcarboxamido)] - 9,10-dihydroxy-1,2,3,4,6,7-hexahydro-11b-H-benzopyridocoline is converted to 2-hydroxy-3-[N-(m-xylylcarboxamido)] - 9,10 - dihydroxy-1,2,3,4,6,7 - hexahydro-11b-H-benzopyridocoline; 2-oxo-3-[N-(p-chlorobenzohydrocarboxamido)] - 1,2,3,4,6,7-hexahydro-11b-H-benzopyridocoline is converted to 2-hydroxy-3-[N-(p-chlorobenzohydrocarboxamido)] - 1,2,3,4,6,7-hexahydro-11b-H-benzopyridocoline; 2-oxo-3-[N-(α-picolynylcarboxamido)] - 9,10 - dimethyl-1,2,3,4,6,7-hexahydro-11b-H-benzopyridocoline is converted to 2-hydroxy-3-[N-(α-picolynylcarboxamido)] - 9,10-dimethyl-1,2,3,4,6, 7 - hexahydro-11b-H-benzopyridocoline; 2-oxo-3-[N-(β-picolynylcarboxamido)] - 9,10-dimethoxy-1,2,3,4,6,7-hexahydro-11b-H-benzopyridocoline is converted to 2-hydroxy-3-[N - (β-picolynylcarboxamido)]-9,10-dimethoxy-1,2,3,4,6,7-hexahydro-11b-H-benzopyridocoline; 2-oxo-3-[N-(γ-picolynylcarboxamido)] - 9,10 - methylenedioxy-1,2,3,4,6,7-hexahydro-11b - H - benzopyridocoline is converted to 2-hydroxy-3-[N(γ-picolynylcarboxamido)]-9,10-methylenedioxy - 1,2,3,4,6,7 - hexahydro-11b-H-benzopyridocoline; 2-oxo-3-(N-lutidinylcarboxamido)-9,10-diethyl-1,2,3,4,6,7 - hexahydro-11b-H-benzopyridocoline is converted to 2-hydroxy-3-(N-lutidinylcarboxamido)-9,10-diethyl - 1,2,3,4,6,7 - hexahydro-11b-H-benzopyridocoline; 2-oxo-3-(N-collidinylcarboxamido) - 9,10 - di(n-butyl) - 1,2,3,4,6,7 - hexahydro-11b-H-benzopyridocoline is converted to 2-hydroxy-3-(N-collidinylcarboxamido)-9,10-di(n-butyl) - 1,2,3,4,6,7 - hexahydro-11b-H-benzopyridocoline; 2-oxo-3-(N-anilinocarboxamido)-9,10-di-isoamyl-1,2,3,4,6,7 - hexahydro-11b-H-benzopyridocoline is converted to 2-hydroxy-3-(N-anilinocarboxamido)-9,10-di-isoamyl - 1,2,3,4,6,7 - hexahydro-11b-H-benzopyridocoline; 2-oxo-3-[N-(p-toluidinocarboxamido)]-9-ethoxy-10-methoxy-1,2,3,4,6,7 - hexahydro-11b-H-benzopyridocoline is converted to 2-hydroxy-3-[N-(p-toluidinocarboxamido)]-9-ethoxy-10-methoxy - 1,2,3,4,6,7 - hexahydro-11b-H-benzopyridocoline; and 2-oxo-3-[N-(p-anisidinocarboxamido)] - 1,2,3,4,6,7-hexahydro-11b-H-benzopyridocoline is converted to 2-hydroxy-3-[N-(p-anisidinocarboxamido)]-1,2,3,4,6,7-hexahydro-11b-H-benzopyridocoline.

In like manner, 2-oxo-3-(N-methyl-N-phenylcarboxamido)-9,10-dimethoxy - 1,2,3,4,6,7-hexahydro-11b-H-benzopyridocoline is converted to 2-hydroxy-3-(N-methyl-N-phenylcarboxamido) - 9,10-dimethoxy-1,2,3,4,6,7-hexahydro-11b-H-benzopyridocoline; 2-oxo-3 - (N-ethyl-N-phenylcarboxamido)-9,10-diethoxy - 1,2,3,4,6,7 - hexahydro-11b-H-benzopyridocoline is converted to 2-hydroxy-3-(N-ethyl-N-phenylcarboxamido)-9,10-diethoxy - 1,2,3, 4,6,7 - hexahydro-11b-H-benzopyridocoline; 2-oxo-3-[N-(2-pyridylcarboxamido)]-9,10-di-isopropoxy - 1,2,3,4,6,7-hexahydro-11b-H-benzopyridocoline is converted to 2-hydroxy-3-[N - (2-pyridylcarboxamido)] - 9,10-di-isopropoxy-1,2,3,4,6,7-hexahydro-11b-H-benzopyridocoline; 2-oxo-3-[N - (3-pyridylcarboxamido)]-9,10-di(n-butoxy)-1,2,3,4,6,7-hexahydro-11b-H-benzopyridocoline is converted to 2-hydroxy-3-[N-(3-pyridylcarboxamido)]-9,10-di(n-butoxy) - 1,2,3,4,6,7-hexahydro-11b-H-benzopyridocoline; 2-oxo-3-[N-(4-pyridylcarboxamido)]-9,10-isoamyloxy-1,2,3,4,6,7 - hexahydro-11b-H-benzopyridocoline is converted to 2-hydroxy-3-[N-(4-pyridylcarboxamido)]-9,10-di-isoamyloxy-1,2,3,4,6,7-hexahydro-11b - H - benzopyridocoline; 2-oxo-3-carbo(N-pyrryl)-9,10-methylenedioxy-1,2,3,4,6,7-hexahydro-11b - H - benzopyridocoline is converted to 2-hydroxy-3-carbo(N-pyrryl)-9,10-methylenedioxy-1,2,3,4,6,7-hexahydro-11b-H-benzopyridocoline; 2-oxo-3-carbo - (N-pyrrolidino)-9,10-dihydroxy-1,2,3,4,6,7-hexahydro-11b-H-benzopyridocoline is converted to 2-hydroxy-3-carbo(N-pyrrolidino) - 9,10 - dihydroxy-1,2,3, 4,6,7-hexahydro-11b-H-benzopyridocoline; 2-oxo-3-carbo (N-piperidino) - 1,2,3,4,6,7 - hexahydro-11b-H-benzopyridocoline is converted to 2-hydroxy-3-carbo(N-piperidino)-1,2,3,4,6,7 - hexahydro-11b-H-benzopyridocoline; 2-oxo-3-carbo[N - (2-methylpiperidino)] - 9,10-dimethyl-1, 2,3,4,6,7 - hexahydro-11b-H-benzopyridocoline is converted to 2-hydroxy-3-carbo[N-(2-methylpiperidino)]-9, 10-dimethyl - 1,2,3,4,6,7 - hexahydro-11b-H-benzopyridocoline; 2-oxo-3-carbo(N-morpholino)-9,10-diethyl-1,2,3, 4,6,7 - hexahydro-11b-H-benzopyridocoline is converted to 2-hydroxy-3-carbo(N-morpholino)-9,10-diethyl-1,2,3, 4,6,7 - hexahydro-11b-H-benzopyridocoline; 2-oxo-3-carbo(N-piperazino)-9,10-dimethoxy - 1,2,3,4,6,7 - hexahydro-11b-H-benzopyridocoline is converted to 2-hydroxy-3-carbo(N-piperazino)-9,10-dimethoxy - 1,2,3,4,6,7-hexahydro-11b-H-benzopyridocoline; and 2-oxo-3-carbo[N-

(N-methylpiperazino)] - 9,10-di-isoamyl-1,2,3,4,6,7-hexahydro-11b-H-benzopyridocoline is converted to 2-hydroxy-3-carbo[N(N-methylpiperazino)] - 9,10-di-isoamyl-1,2,3,4,6,7-hexahydro-11b-H-benzopyridocoline.

Example VI

The non-toxic hydrohalide acid addition salts of each of the benzopyridocoline bases reported in Examples I–V, such as the hydrochloride, hydrobromide and hydriodide salts thereof, are prepared by first dissolving the respective benzopyridocoline amide base in absolute ether followed by introduction of the appropriate hydrogen halide gas into the solution until saturation is effected, whereupon the desired salt precipitates from the solution. The crystalline product so obtained is then recrystallized from acetone-ether to yield the pure hydrohalide salt. For instance, when 1.0 g. of 2-oxo-3-(N,N-diethylcarboxamido) - 9,10 - dimethoxy-1,2,3,4,6,7-hexahydro-11b-H-benzopyridocoline is dissolved in anhydrous diethyl ether and dry hydrogen chloride gas is passed into the resulting solution until saturation of same is complete with respect to said gas, there is obtained a crystalline precipitate of 2-oxo-3-(N,N-diethylcarboxamido) - 9,10-dimethoxy-1,2,3,4,6,7-hexahydro-11b-H-benzopyridocoline hydrochloride.

Example VII

The nitrate, sulfate or bisulfate, phosphate or acid phosphate, acetate, lactate, citrate or acid citrate, tartrate or bitartrate, oxalate, succinate, maleate, gluconate and saccharate salts of each of the benzopyridocoline bases reported in Examples I–IV are all prepared by separately dissolving in a suitable amount of ethanol the proper molar amounts of the respective acid and the appropriate benzopyridocoline base and then mixing the two solutions together, followed by the addition of diethyl ether to the resulting reaction mixture in order to effect precipitation of the desired acid addition salt from said solution. For instance, when equimolar amounts of 2-hydroxy-3-(N,N-diethylcarboxamido) - 9,10 - dimethoxy-1,2,3,4,6,7-hexahydro-11b-H-benzopyridocoline and glacial acetic acid react in accordance with this procedure, the corresponding product obtained is the acetic acid addition salt of 2-hydroxy - 3 - (N,N-diethylcarboxamido)-9,10-dimethoxy-1,2,3,4,6,7-hexahydro-11b-H-benzopyridocoline.

Example VIII 2-oxo - 3 - (N,N-dithylcarboxamido)-9,10-dimethoxy-1,2,3,4,6,7-hexahydro-11b-H-benzopyridocoline is reacted with an equimolar amount of methyl chloride in an isopropanol solvent medium by allowing said reaction solution to stand at room temperature for 18 hours, and then raising the temperature to 90–100° C. for 30 minutes. The crystals which separate can be recrystallized from isopropanol-methyl ethyl ketone to afford the methyl chloride quaternary ammonium salt of 2-oxo-3-(N,N-di-ethylcarbohydrazido) - 9,10 - dimethoxy-1,2,3,4,6,7-hexahydro-11b-H-benzopyridocoline.

This same benzopyridocoline base also reacts with methyl iodide in anhydrous diethyl ether to offer the corresponding methyl quaternary ammonium iodide, while reaction of the above base with ethyl bromide in methyl ethyl ketone at 50–60° C. for 18 hours and then at 100° C. for 2 hours yields the corresponding ethyl quaternary ammonium bromide.

In the same manner, each of the other benzopyridocoline compounds prepared in Examples I–IV are reacted with each of the aforementioned methyl halides, as well as with allyl chloride and benzyl bromide, to afford the corresponding quaternary ammonium halides. Similarly, reaction of each of these reported benzopyridocoline amine bases with such reagents as dimethyl sulfate, diethyl sulfate, methyl benzenesulfonate and ethyl p-toluenesulfonate yields the corresponding quaternary ammonium sulfates in each case.

Example IX

A dry solid pharmaceutical composition is prepared by blending the following materials in the proportions by weight specified:

| | |
|---|---|
| 2-oxo - 3 - (N,N-diethylcarboxamido)-9,10-dimethoxy - 1,2,3,4,6,7 - hexahydro-11b-H-benzopyridocoline | 10 |
| Dicalcium phosphate | 45 |
| Potato starch | 20 |
| Lactose | 15 |
| Polyvinylpyrrolidone | 8 |
| Magnesium stearate | 2 |

After the dried composition is thoroughly blended, tablets are punched from the resulting mixture, each tablet being of such size that it contains 50 mg. of the active ingredient.

Example X

A dry solid pharmaceutical composition is prepared by combining the following materials in the proportions by weight specified:

| | |
|---|---|
| 2-oxo - 3 - (N,N-dimethylcarboxamido)-9,10-dimethoxy - 1,2,3,4,6,7 - hexahydro-11b-H-benzopyridocoline | 10 |
| Polyethylene glycol (average molecular weight, 6000) | 30 |
| Lactose | 40 |
| Calcium carbonate | 20 |

The dried solid mixture so prepared is thoroughly agitated so as to obtain a powdered product that is completely uniform. Soft elastic and hard shelled gelatin capsules containing this pharmaceutical composition are then prepared, employing a sufficient quantity of material so as to furnish 250 mg. of the active ingredient in each capsule.

Example XI

An aqueous propylene glycol solution containing 2-hydroxy - 3 - (N,N-diethylcarboxamido)-9,10-dimethoxy-1,2,3,4,6,7 - hexahydro-11b-H-benzopyridocoline hydrochloride is prepared by dissolving the latter compound in propylene glycol-water (1:3 by weight) with the aid of gentle heating. The amount of compound employed is such that the resulting solution contains 5 mg. of the active ingredient per ml. After cooling to room temperature, it is sterilized by means of filtration through a Seitz filter. The sterile aqueous propylene glycol solution so obtained is suitable for intramuscular administration to animals.

What is claimed is:

1. A compound selected from the group consisting of benzopyridocolines corresponding to the structural formula:

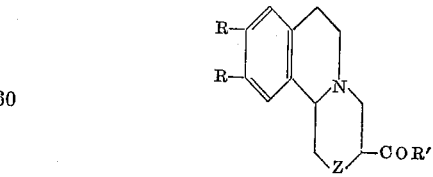

the pharmaceutically acceptable acid addition salts thereof and quaternary ammonium salts thereof, said quaternary ammonium salts being selected from the group consisting of methyl iodide, ethyl chloride, allyl chloride, benzyl bromide, sulfuric acid lower alkyl ester, methyl benzenesulfonate, and ethyl p-toluenesulfonate salts; wherein R is a member of the group consisting of hydrogen, hydroxy, lower alkoxy and alkyl having from one to five carbon atoms, and when both R groups are taken together they form a methylenedioxy group; R' is chosen from the group consisting of amino, N-monoalkylamino, N,N-dialkylamino, N-aralkylamino, N-picolinylamino, N-lutidinylamino, N-collidinylamino, N-anilino, N-(p-toluidino), N-(p-anisidino), N-pyridylamino, N-alkyl-N-phenylamino, N-pyrryl, N-pyrrolidino, N-piperidino, N-(2-methylpiperidino), N-morpholino, N-piperazino and N-(N'-methylpiperazino), each alkyl group in R' being lower alkyl; and Z is a member of the group consisting of carbonyl and hydroxymethylene.

2. 2-oxo - 3 - (N,N-diethylcarboxamido)-9,10-dimethoxy-1,2,3,4,6,7-hexahydro-11b-H-benzopyridocoline.

3. 2-oxo - 3 - (N-methyl-N-phenylcarboxamido)-9,10-dimethoxy - 1,2,3,4,6,7 - hexahydro-11b-H-benzopyridocoline.

4. 2-oxo - 3 - carbo(N-pyrrolidino)-9,10-dihydroxy-1,2,3,4,6,7-hexahydro-11b-H-benzopyridocoline.

5. 2-oxo - 3 - carbo(N-piperidino)-1,2,3,4,6,7-hexahydro-11b-H-benzopyridocoline.

6. 2-oxo - 3 - carbo(N-morpholino)-9,10-diethyl-1,2,3,4,6,7-hexahydro-11b-H-benzopyridocoline.

7. 2-oxo - 3 - carbo(N-piperazino)-9,10-dimethoxy-1,2,3,4,6,7-hexahydro-11b-H-benzopyridocoline.

8. 2-hydroxy - 3 - (N,N-diethylcarboxamido)-9,10-dimethoxy-1,2,3,4,6,7-hexahydro-11b-H-benzopyridocoline.

References Cited in the file of this patent
UNITED STATES PATENTS

| | | |
|---|---|---|
| 2,719,156 | De Benneville | Sept. 27, 1955 |
| 2,830,992 | Brossi et al. | Apr. 15, 1958 |
| 2,830,993 | Brossi et al. | Apr. 15, 1958 |
| 2,957,872 | Huebner | Oct. 25, 1960 |

FOREIGN PATENTS

| | | |
|---|---|---|
| 1,032,255 | Germany | June 19, 1958 |
| 1,068,261 | Germany | Nov. 5, 1959 |

OTHER REFERENCES

Brossi et al.: Helvetica Chimica Acta, vol. 41 (part I), page 119 (1958).